(12) United States Patent
Zenno

(10) Patent No.: US 8,177,684 B2
(45) Date of Patent: May 15, 2012

(54) GEAR CHANGE CONTROL DEVICE AND METHOD

(75) Inventor: Toru Zenno, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 887 days.

(21) Appl. No.: 12/210,046

(22) Filed: Sep. 12, 2008

(65) Prior Publication Data

US 2009/0011900 A1 Jan. 8, 2009

Related U.S. Application Data

(63) Continuation of application No. 11/299,858, filed on Dec. 12, 2005, now Pat. No. 7,476,179.

(30) Foreign Application Priority Data

Dec. 10, 2004 (JP) ................................. 2004-359229

(51) Int. Cl.
*B60W 10/02* (2006.01)
(52) U.S. Cl. ............... 477/79; 477/77; 477/80; 477/174
(58) Field of Classification Search .................... 477/70, 477/77, 79, 80, 115, 167, 174
See application file for complete search history.

(56) References Cited

U.S. PATENT DOCUMENTS

| | | | |
|---|---|---|---|
| 4,497,222 A | 2/1985 | Nagaoka et al. | |
| 5,299,652 A * | 4/1994 | Bevins | 180/219 |
| 5,964,680 A | 10/1999 | Salecker et al. | |
| 6,243,637 B1 * | 6/2001 | Minowa et al. | 701/51 |
| 6,257,081 B1 | 7/2001 | Gagnon et al. | |
| 6,295,498 B1 * | 9/2001 | Gleason et al. | 701/55 |

(Continued)

FOREIGN PATENT DOCUMENTS

DE 10 2005 014505 A1 10/2005

(Continued)

OTHER PUBLICATIONS

International Search Report for Application No. EP 05 02 7014, completed on Jun. 20, 2008 in 5 pages.

*Primary Examiner* — Ha D. Ho
(74) *Attorney, Agent, or Firm* — Keating & Bennett, LLP

(57) ABSTRACT

A gear change control device is provided for a straddle-type vehicle having a clutch and a transmission. The device includes a clutch actuator configured to engage and disengage the clutch. A transmission actuator is configured to change a gear of the transmission. At least one sensor is configured to sense an operational condition of the straddle type vehicle. At least one switch is configured to generate a gear change command. A controller is operatively connected to the clutch actuator, the transmission actuator, the at least one sensor, and the at least one switch. The controller is configured to change gears in response to the gear change command and during the gear change reengage the clutch under either a first control routine or second, different control routine based upon the operational condition of the straddle-type vehicle determined by the at least one sensor.

15 Claims, 11 Drawing Sheets

| U.S. PATENT DOCUMENTS | | | | FOREIGN PATENT DOCUMENTS | | |
|---|---|---|---|---|---|---|
| 6,524,224 B2 | 2/2003 | Gagnon et al. | | EP | 385629 | 9/1990 |
| 6,564,663 B2 | 5/2003 | Rioux et al. | | EP | 0638 454 A1 | 2/1995 |
| 6,569,057 B2 | 5/2003 | Jones et al. | | EP | 742386 | 11/1996 |
| 6,896,112 B2 | 5/2005 | Berger et al. | | JP | 10-287150 | 10/1998 |
| 6,910,987 B2 | 6/2005 | Richards | | WO | WO 02/46636 A1 | 6/2002 |
| 6,931,839 B2 | 8/2005 | Foster | | | | |
| 7,000,717 B2 | 2/2006 | Ai et al. | | * cited by examiner | | |

GEAR CHANGE CONTROL DEVICE AND METHOD

CROSS-REFERENCE TO RELATED APPLICATIONS

This application is a Continuation of U.S. patent application Ser. No. 11/299,858, filed Dec. 12, 2005, which claims priority under 35 U.S.C. §119 to Japanese Patent Application No. 2004-359229, filed on Dec. 10, 2004, the entire contents of both of which is expressly incorporated by reference herein.

BACKGROUND OF THE INVENTION

1. Field of the Invention

This invention relates to a device and method for controlling gear changes, and more particularly, to a device and method for controlling gear changes in a straddle-type vehicle.

2. Description of the Related Art

Japanese patent publication JP-A-Hei 10-287150 describes a straddle-type vehicle (e.g., a motorcycle) that has a clutch and a transmission driven by actuators (e.g., motors). Vehicles with such gear change control systems are increasingly popular. When a rider of such a straddle-type vehicle inputs a gear change command manually, the clutch and the transmission in conjunction with each other automatically perform a series of gear change operations. For example, a clutch actuator automatically disengages the clutch, a shift actuator automatically shifts up or down the transmission, and then the clutch actuator automatically reengages the clutch.

SUMMARY OF THE INVENTION

One aspect of the present invention is the realization that the gear change control system described above is intended for changing gears while the vehicle is running. However, it is difficult to apply the same gear change control routine when the vehicle starts to run. That is, when the vehicle starts to run, the vehicle speed is not increased enough and the rotational speed difference between the driving member (e.g., a friction disk for a wet multi-plate clutch) and the driven member (e.g., a clutch disk for a wet multi-plate clutch) of the clutch is often larger than during running conditions. Therefore, the gear change control routine that is used while the vehicle is running will not provide smooth gear changes when the vehicle starts to run. This may impair the riding comfort of the straddle-type vehicle.

Therefore, one object of the present invention is to provide a gear change control device and method that can more smoothly change transmission gears when the vehicle starts to run.

Accordingly, one aspect of the present invention comprises a gear change control device for a straddle-type vehicle having a clutch and a transmission driven by respective actuators. The device includes means for engaging the clutch under a first control routine when the straddle-type vehicle is starting to run with the clutch disengaged and the transmission in gear. The device also includes means for determining whether a gear change command has been given to the transmission. The device further includes means for, when a gear change command is given, causing the transmission to change gears according to the gear change command once the clutch is disengaged and then reengaging the clutch under either the first control routine or a second control routine that is different from the first control routine depending on a state of the straddle-type vehicle.

Another aspect of the present invention comprises a method for operating a straddle-type vehicle having a clutch and a transmission driven by respective actuators, comprising. In the method, the clutch is engaged under a first control routine when the straddle-type vehicle is being started from a stopped condition in which the clutch is disengaged and the transmission is in gear. It is determined whether a gear change command is given to the transmission. When a gear change command is given, the clutch is disengaged and the gears changed according to the gear change command once the clutch is disengaged. An operating state of the straddle-type vehicle is determined and, depending upon the operating state, the clutch is reengaged under either the first control routine or a second control routine that is different from the first control routine.

Another aspect of the present invention is a gear change control device that is provided for a straddle-type vehicle having a clutch and a transmission. The device includes a clutch actuator configured to engage and disengage the clutch. A transmission actuator is configured to change a gear of the transmission. At least one sensor is configured to sense an operational condition of the straddle type vehicle. At least one switch is configured to generate a gear change command. A controller is operatively connected to the clutch actuator, the transmission actuator, the at least one sensor, and the at least one switch. The controller is configured to change gears in response to the gear change command and during the gear change reengage the clutch under either a first control routine or second, different control routine based upon the operational condition of the straddle-type vehicle determined by the at least one sensor.

Another aspect of the present invention is a method for operating a straddle-type vehicle having a clutch and a transmission driven by respective actuators. The method comprises determining whether a gear change command is given to the transmission and, when a gear change command is given, disengaging the clutch, changing gears according to the gear change command once the clutch is disengaged, determining an operating state of the straddle-type vehicle; and depending upon the operating state, reengaging the clutch under either the first control routine or a second control routine that is different from the first control routine.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general structure that implements various features of specific embodiments of the invention will now be described with reference to the drawings. The drawings and the associated descriptions are provided to illustrate embodiments of the invention and not to limit the scope of the invention.

DETAILED DESCRIPTION OF THE PREFERRED EMBODIMENTS

Figure 1:
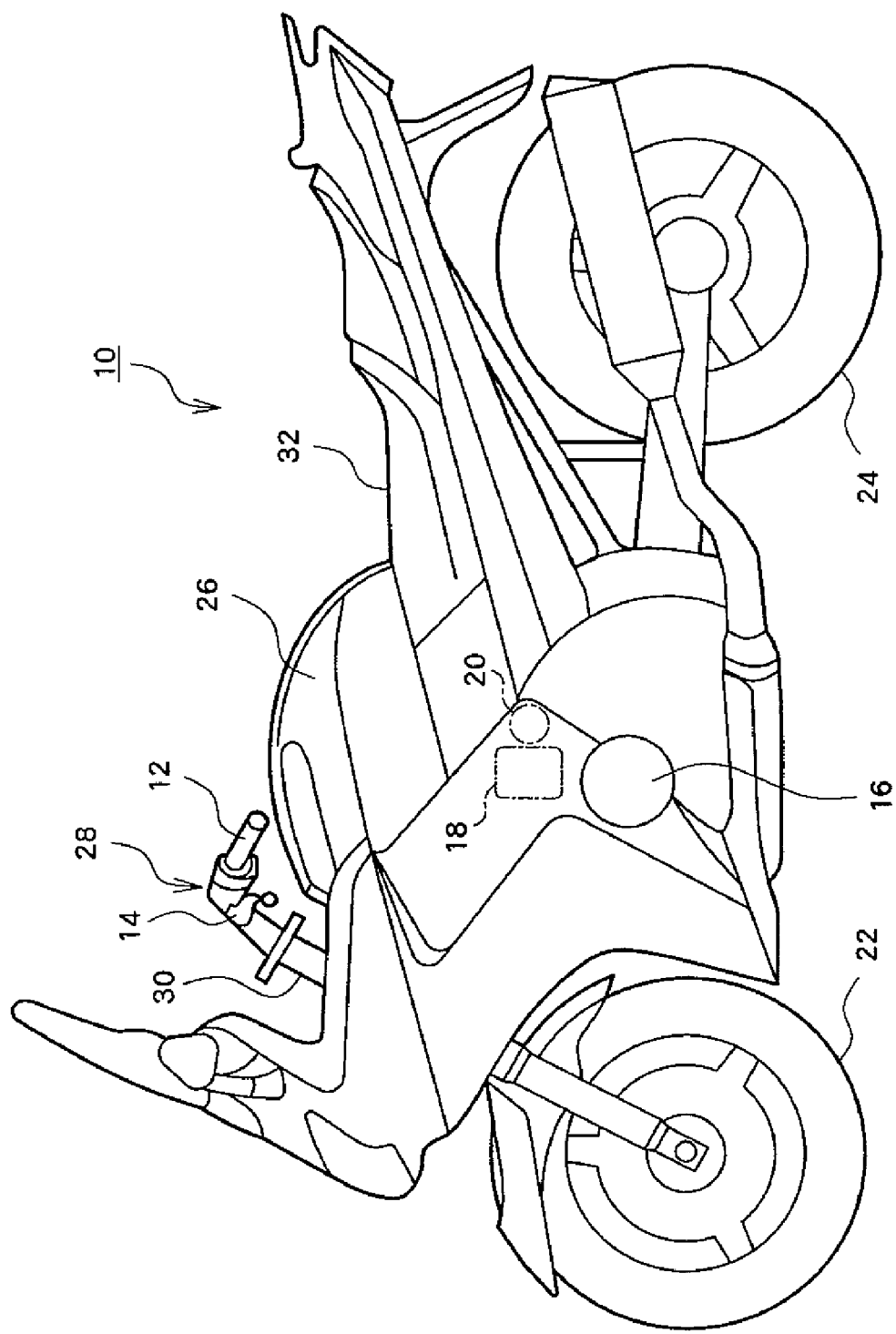
FIG. 1 is a side elevational view of a motorcycle according to an embodiment of the present invention.

FIG. 1 is an external side view of a motorcycle according to an embodiment of the present invention. In illustrated embodiment, the motorcycle 10 can include a front wheel 22 and a rear wheel 24. Handlebars 28, which can extend transversely with respect to the running direction of the vehicle 10, can be attached to a top or upper end of a front fork 30. The bottom or lower end of the front fork 30 can be, in turn, attached or coupled to the front wheel 22. A grip 12 and a clutch lever 14 can be attached or coupled to a first (e.g., left) end of the handlebars 28 and an accelerator grip and a brake lever (not shown) can be attached to the other (e.g., right) end of the handlebars 28.

With continued reference to FIG. 1, the motorcycle 10 can be provided with a seat 32 that is positioned on an upper part of the motorcycle 10. The seat 32 can be configured such that a rider can straddle the motorcycle 10. Thus, the motorcycle 10 of FIG. 1 is a straddle-type, street vehicle, which includes a gear change control device and system that will be described in detail below. While the gear change control device and system has certain advantages in a street motorcycle, it is anticipated that the gear change control device and system described herein can also be used in other types straddle-type vehicles including but not limited to other types of motorcycles (e.g., motorized bicycles and scooters), all-terrain straddle-type vehicles, snowmobiles, etc. In these embodiments, the straddle-type vehicle may be driven by various drive devices, such as, for example, an internal combustion engines engine, electric motors, and hybrids of both. The gear change control device and system described herein are particularly advantageous in straddle-type vehicles because they are generally lightweight and thus can often gain significant vehicle speed during starting conditions (e.g., before the clutch is completely engaged). Therefore, it is highly anticipated that gear change commands will be inputted during starting conditions. An advantage embodiments described herein is that the gear change control system can appropriately respond to such gear change command inputs to suitably change transmission gears during starting conditions.

As shown in FIG. 1, the general construction of the illustrated motorcycle 10 is similar to those of well-known street motorcycles. Thus, the illustrated embodiment can include a clutch actuator 18 that can be installed above an engine 16 of the motorcycle 10 below a fuel tank 26. The actuator 18 can be configured to actuate (e.g., through a motor) a clutch provided in a crankcase of the engine 16. A shift actuator 20 can be provided to actuate (e.g., through a motor) a transmission provided in a transmission case of the engine 16. The operation of the clutch actuator 18 is controlled by a gear change control device or system 40 (see FIG. 2) to engage and disengage the clutch. The shift actuator 20 is also controlled by the control device 40 to shift the transmission. The clutch lever 14 is operatively connected to the clutch actuator 18 through, for example, a wire or other transmission device so that the clutch can also be engaged and disengaged through the clutch lever 14.

Figure 2:
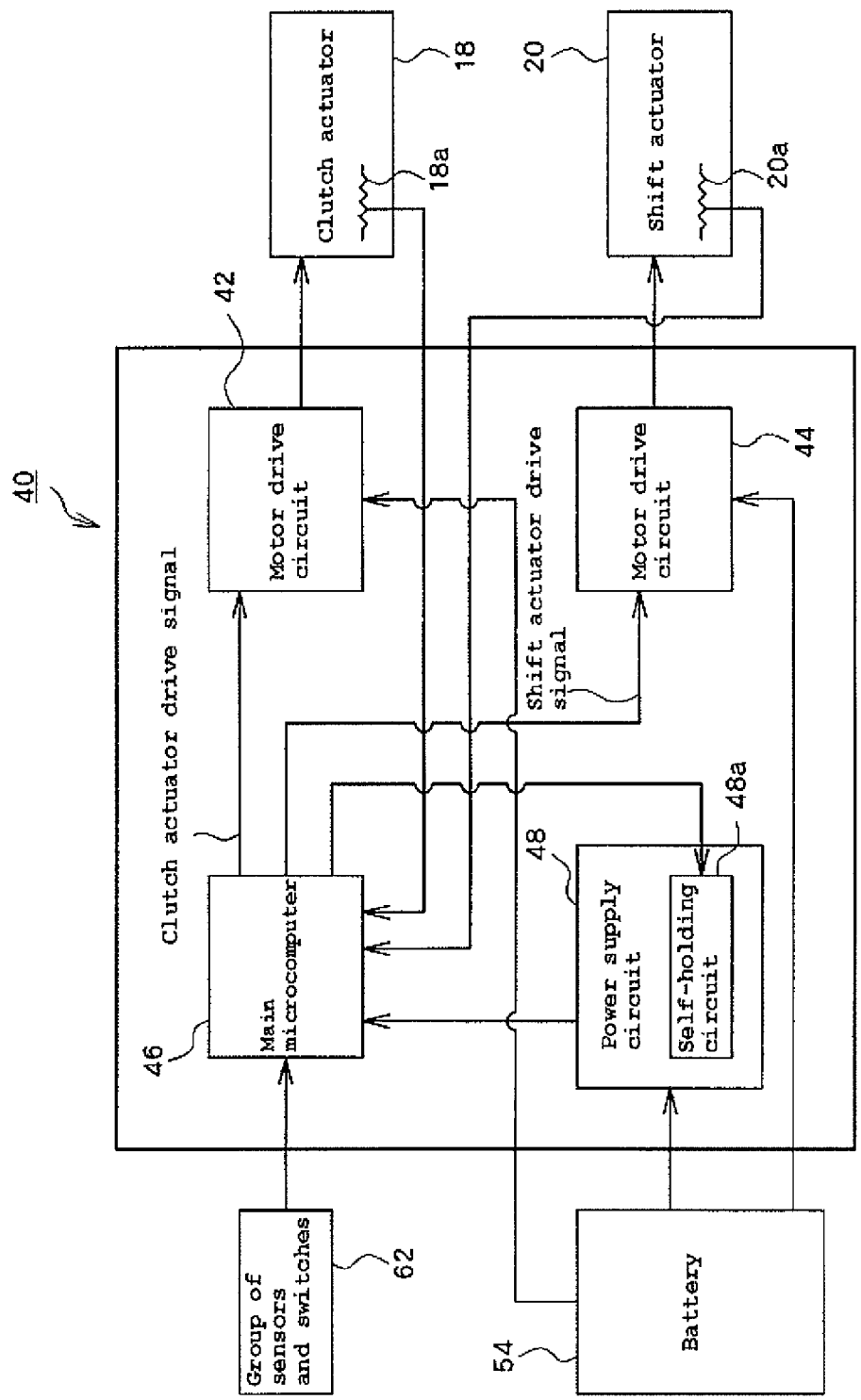
FIG. 2 is a schematic illustration of a gear change control device according to an embodiment of the present invention.

FIG. 2 is a schematic illustration of an embodiment of the gear change control device 40 of the motorcycle 10. As shown in FIG. 2, a group of sensors and switches 62, the clutch actuator 18, and the shift actuator 20 can be operatively connected to the control device 40 A battery 54 can also be operatively connected to the control device 40 to supply electric power to the control device 40. The electric power can also be supplied to the clutch actuator 18 and the shift actuator 20 via the control device 40 as will be described below. The electric power can be used to operate the control device 40, as well as the clutch actuator 18 and the shift actuator 20.

In this application, various components are described as being "operatively connected" to the control unit. It should be appreciated that this is a broad term that includes physical connections (e.g., electrical wires) and non-physical connections (e.g., radio or infrared signals). It should also be appreciated that "operatively connected" includes direct connections and indirect connections (e.g., through an additional intermediate device).

In the illustrated embodiment, the clutch actuator 18 can include a DC motor for disengaging the clutch by forward drive of the DC motor and reengaging the clutch by reverse drive, and setting the clutch position to any state between the engaged state and the disengaged state. The clutch actuator 18 can be provided with a clutch potentiometer 18a, that comprises, for example, a resistor or another suitable device, for applying a voltage indicating the state of the clutch actuator 18, or a voltage indicating the clutch position, to the control device 40. The voltage value can be used by the control device 40 to indicate clutch position. The motorcycle 10 can include one clutch for preventing the rotational driving force of the engine 16 from not being inputted to the transmission when both starting to run and shifting the transmission.

The shift actuator 20 can also include a DC motor for shifting up by forward drive of the DC motor and shifting down by reverse drive. The shift actuator 20 can be attached to a shift arm of the transmission. The DC motor can rotate the shift arm in one direction by forward drive and in the opposite direction by reverse drive. The shift actuator 20 can be provided with a shift potentiometer 20a, which comprises a resistor or the like, for applying a voltage indicating the state of the shift actuator 20, or a voltage indicating the rotation angle of the shift arm, to the control device 40. The voltage value can be used by the control device 40 for indicating rotation angle. The transmission can be configured in a variety of ways and, in one embodiment, can include neutral and first to fifth gear positions and can be a conventional type of transmission (e.g., a dog transmission).

Figure 3:
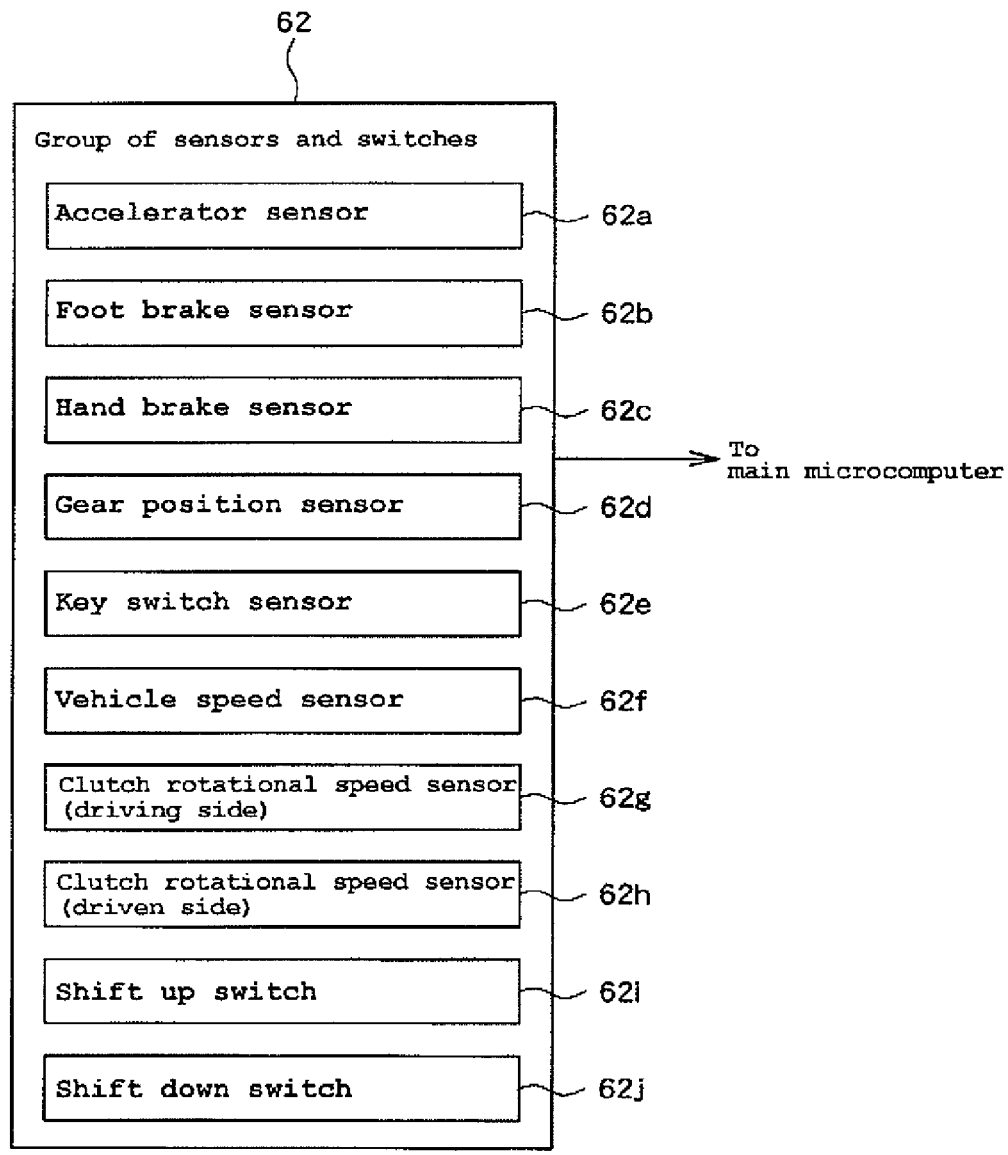
FIG. 3 is a schematic illustration of a group of sensors and switches of the gear change control device of FIG. 2.

As shown in FIG. 3, the group of sensors and switches 62 can include an accelerator sensor 62a, a foot brake sensor 62b, a hand brake sensor 62c, a gear position sensor 62d, a key switch sensor 62e, a vehicle speed sensor 62f, driving side clutch rotational speed sensor 62g, a driven side clutch rotational speed sensor 62h, a shift up switch 62i, and a shift down switch 62j. The accelerator sensor 62a can be configured to detect the accelerator opening and to input relevant data to the control device 40. The foot brake sensor 62b can be configured to input to the control device 40 data indicating the depression angle of a rear wheel brake attached to the rear wheel 24 and/or whether or not the rear wheel brake is depressed. The hand brake sensor 62c can be configured to input to the control device 40 data indicating the operation amount of a front wheel brake attached to the front wheel 22 and/or whether or not the front wheel brake is operated. The gear position sensor 62d can be attached to the transmission and can be configured to input to the control device 40 data indicating the current gear position (e.g., a rotation amount of a shift drum). The key switch sensor 62e can be configured to detect the state of a key switch (e.g., on or off, or the like) and can be configured to input relevant data to the control device 40.

The vehicle speed sensor 62f can be configured detect the vehicle speed (or equivalent information) and to input relevant data to the control device 40. The vehicle speed sensor 62f can be configured to detect the vehicle speed by detecting the rotational speed of a drive shaft (or countershaft) of the transmission or the amount of movement of a component coupled to the drive shaft (preferably without play) such as a chain, a shaft drive section, or a tire wheel. The vehicle speed sensor 62f may also be configured to obtain the vehicle speed by detecting the rotational speed of a middle shaft (e.g., idler shaft) of the transmission and multiplying the detected value by the speed reduction ratio corresponding to the current gear position of the transmission.

The driving side clutch rotational speed sensor 62g can be configured to detect the rotational speed of a driving member of the clutch and to input relevant data to the control device 40. In one embodiment, the clutch is a wet multi-plate type of clutch. In such an embodiment, the driving member (from which rotational speed can be detected by the driving side clutch rotational speed sensor 62g) can be a friction disk, for example. In turn, the driven side clutch rotational speed sensor 62h can be configured to detect the rotational speed of a driven member (e.g., a follower member) of the clutch and to input relevant data to the control device 40. In an embodiment that utilizes a wet-multi-plate type of clutch, the driven member (from which rotational speed can be detected by the driven side clutch rotational speed sensor 62h) is a clutch disk, for example. The control device 40 can be configured to compute the difference between the rotational speeds inputted from the driving and driven side clutch rotational speed sensors 62g, 62h and to use the computed difference as a clutch rotational speed difference to control the clutch actuator 18 as will be described below. In some embodiments, instead of the driving side clutch rotational speed sensor 62g, a sensor configured for detecting the rotational speed of the engine 16 (e.g., a crankshaft sensor) or the middle shaft may be provided. In such embodiments, the rotational speed of the friction disk can be obtained by multiplying the detection results by the sensor by a predetermined speed reduction ratio. When the transmission is not in neutral, the rotational speed of the clutch disk can be obtained by dividing the rotational speed of the drive shaft or the amount of movement of a component coupled to the drive shaft without play such as a chain, a shaft drive section, or a tire wheel by the speed reduction ratio corresponding to the current gear position.

The shift up switch 62i can be provided in the vicinity of the grip 12 of the handlebars 28. In one embodiment, when the rider presses down on the shift up switch 62i, a shift up command (i.e., a gear change command) is inputted to the control device 40. The shift down switch 62j can also be provided in the vicinity of the grip 12 of the handlebars 28. In one embodiment, when the rider presses down on the shift down switch 62j, a shift down command (i.e., a gear change command) is inputted to the control device 40. Of course those of skill in the art will recognized that the shift up and shift down switches 62i, j can be arranged in different manners give the goal of providing a device that the rider can actuate to indicate a desire to switch gears up and/or down. For example, the up and down switches 62i, j can be combined into a single device (e.g., lever or knob) and/or comprise a different type of actuator (e.g., buttons, levers, etc.).

With reference back to FIG. 2, the control device 40 is a feedback control device that can include of one or more hard-wired circuits, dedicated processors and memory, and/or a general purpose processor and memory running one or a plurality of control programs. In the illustrated embodiment, the control device 40 includes a main microcomputer 46, which can utilize or calculate various control maps or formulas (e.g., correlations of reference control signals to various operating conditions of the engine or other fundamental engine control data) that may be stored in advance in a storage device (e.g., ROM). For example, as will be explained in detail below, the microcomputer 46 can be configured to control the operation of the clutch actuator 18 and the shift actuator 20 based on the various information indicating the state of the vehicle inputted from the group of sensors and switches 62, the clutch potentiometer 18a, and the shift potentiometer 20a. For easier understanding, the control device 40 and its components will be described as if they discriminate and substantial units. However, in modified embodiments, the control device 40 and/or its components can be part other control systems of the motorcycle 10. In addition, various components, functions and aspects of the control device 40 and its components may be grouped and/or separated into sub-devices or separate devices.

The components of the control device 40 will now described in more detail. With reference to the illustrated embodiment of FIG. 2, the control device 40 includes the main microcomputer 46, a power supply circuit 48, a motor drive circuit 42 configured to drive the clutch actuator 18, and a motor drive circuit 44 configured to drive the shift actuator 20.

The power supply circuit 48 can include a switch (not shown), which turns on in conjunction with the key switch and a self-holding circuit 48a. When the switch turns on, the power supply circuit 48 can covert a voltage of a battery 54 into a driving voltage for the main microcomputer 46 and can start applying the converted voltage to the main microcomputer 46. Even after the key switch is turned off, the switch can be held on by the self-holding circuit 48a. Until the main microcomputer 46 is completely shut down, the power supply circuit 48 can continue to apply the driving voltage. When the shutdown process is complete, the main microcomputer 46 can command the self-holding circuit 48a to stop the power supply. Then, the power supply circuit 48 can stop the power supply to the main microcomputer 46.

The motor drive circuit 42 can include a known-type H-bridge circuit or another appropriate circuit. The motor drive circuit 42 can be configured to supply a current from the battery 54 to the DC motor, which causes the clutch actuator 18 to rotate in a direction and at a rate in accordance with a clutch actuator drive signal supplied from the main microcomputer 46. The motor drive circuit 44 can also include a known-type H-bridge circuit or another appropriate circuit. The motor drive circuit 52 is configured to supply a current from the battery 54 to the DC motor, which causes the shift actuator 20 to rotate in a direction and at a rate in accordance with a shift actuator drive signal supplied from the main microcomputer 46.

As mentioned above, the main microcomputer 46 can comprise a known-type computer and is configured to control the operation of the clutch actuator 18 and the shift actuator 20 based on the various information indicating the state of the vehicle inputted from the group of sensors and switches 62, the clutch potentiometer 18*a*, and the shift potentiometer 20*a* as described above. The main microcomputer 46 can also be configured to execute the shutdown process after the key switch is turned off, and commands the self-holding circuit to stop the power supply when the shutdown process is finished.

With reference to FIGS. 4-11, a gear change control routine which can be executed by the gear change control device 40 will now be describe. In one embodiment, the routine provides for engaging the clutch under a first control routine when the straddle-type vehicle is being started from a stopped or stopping condition. In such an embodiment, if a gear change command is given while the clutch is being engaged to start the straddle-type vehicle to run, or in other words before the clutch is completely engaged, the clutch is engaged and the transmission is caused to change gears. Then, the clutch is reengaged under either the first control routine or a second control routine, depending on the vehicle state. The vehicle state can be the rotational speed difference between the driving member and the driven member of the clutch, the speed of the straddle-type vehicle, the output of a drive source provided in the straddle-type vehicle (such as engine speed), and/or other relevant parameters. According to one embodiment, if a gear change command is given while the vehicle is starting to run, the clutch is reengaged under either the control routine (or substantially similar control routine) that was initially used to start the vehicle to run (i.e., the first control routine) or different control from the former, depending on the vehicle state. Therefore, the clutch can be reengaged smoothly according to the vehicle state.

Figure 4:
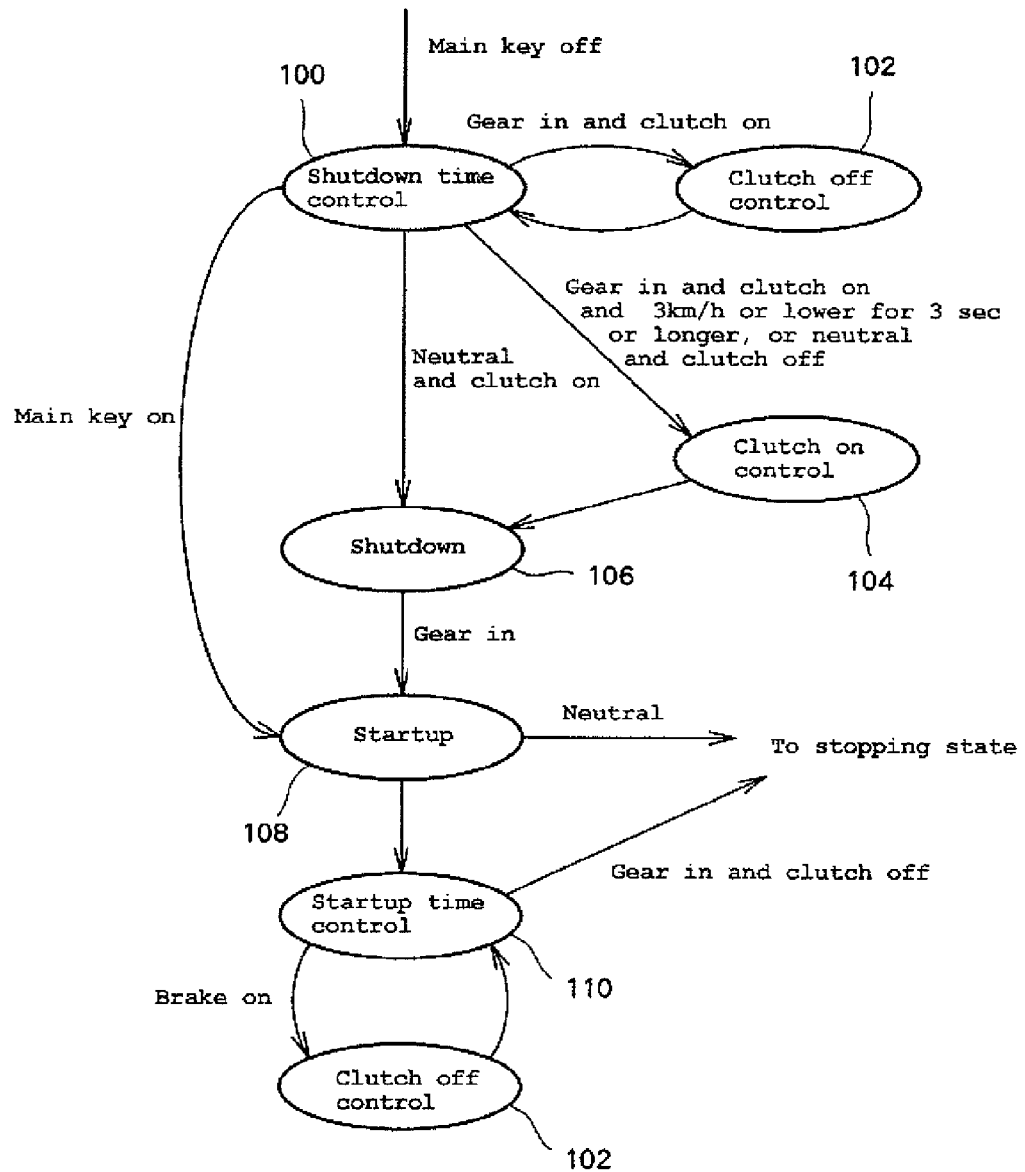
FIG. 4 is a schematic illustration of a control routine that can be executed by the gear change control device of FIG. 2.

With reference to illustrated embodiment, FIG. 4 is a control state transition diagram illustrating an embodiment of a control method that can be executed by the control device 40 when a main key is turned on and off. As shown in the drawing, the main microcomputer 46 can be configured to execute a shutdown time control program 100, a clutch off control program 102, a clutch on control program 104, a shutdown program 106, a startup program 108, and a startup time control program 110. These programs can be stored beforehand in a ROM (information storage medium) included in the main microcomputer 46.

The shutdown time control program 100 can be executed when data inputted from the key switch sensor 62*e* indicates that a key switch 60 has been turned off. If the gear is in and the clutch is on, the clutch off control program 102 is started up. The clutch off control program 102 makes the clutch disengage and then the shutdown time control program 100 resumes its control. The term "the gear is in" refers to a state where the transmission of the motorcycle 10 is engaged in any gear position, or in other words an occasion where data inputted from the gear position sensor 62*d* indicates that the transmission is set to any of the first to fifth gear positions, for example, (i.e., gears positions other than neutral). The term "the clutch is on" refers to an occasion where clutch position data obtained from on the output from the clutch potentiometer 18*a* indicates that the clutch is engaged (i.e., the clutch is on).

If the gear is in and "the clutch is off" and "the vehicle is stopping" or if neutral and the clutch is off, the shutdown time control program 100 can execute the clutch on control program 104. The clutch on control program 104 controls the clutch to be engaged and then the shutdown program 106 is subsequently executed. The term "the clutch is off" refers to a condition where clutch position data obtained from the output from the clutch potentiometer 18*a* indicates that the clutch is disengaged (i.e., the clutch is off). The term "the vehicle is stopping" refer to a condition where vehicle speed data inputted from the vehicle speed sensor 62*f* continues to indicate a predetermined speed (e.g., 3 km per hour) or lower for a predetermined period (e.g., 3 seconds) or longer or some other indication that the vehicle is stopping. The term "neutral" refers to a condition where data inputted from the gear position sensor 62*d* indicates that the transmission of the motorcycle 10 is in a neutral position.

With continued reference to FIG. 4, the shutdown time control program 100 can also start up the shutdown program 106 if the motorcycle 10 is in neutral and the clutch is on. However, if data that indicates the key switch 60 has been turned on are inputted during the shutdown time control, the startup program 108 is executed.

The clutch off control program 102 supplies a clutch actuator drive signal of a predetermined pattern to the motor drive circuit 42 to disengage the clutch by forward rotation of the DC motor 18*a* of the clutch actuator 18. On the other hand, the clutch on control program 104 supplies a clutch actuator drive signal of a predetermined pattern to the motor drive circuit 42 to engage the clutch by reverse rotation of the DC motor 18*b*.

The shutdown program 106 can stop the operation of the main microcomputer 46. Here, the shutdown program 106 can supply a command signal to stop the power supply to the self-holding circuit 48*a*. This can allow the power supply circuit 48 to stop the power supply to the main microcomputer 46.

The startup program 108 can be executed when a key to the motorcycle 10 is inserted into the key switch 60 and turned on while the vehicle is stopping or while the shutdown time control program 100 is being executed. Whether or not the key is inserted into the key switch 60 and turned on can be determined based on the output from the key switch sensor 62*e*. The startup program 108 can initialize the components of the control device 40 and can determine whether or not the transmission of the motorcycle 10 is in neutral. If the motorcycle is in neutral, the control proceeds to normal control (e.g., the stopping state program 202 shown in FIG. 5). If the transmission of the motorcycle 10 is in gear at startup, the startup program 108 starts up the startup time control program 110. The startup time control program 110 monitors whether or not the brake is operated, and when the brake is operated (i.e., the brake in on), starts up the clutch off control program 102. When the clutch is disengaged, the startup time control program 110 resumes its control. If the gear is in and the clutch is off, the control proceeds to the normal control (e.g., the stopping state program 202 shown in FIG. 5). Whether or not the brake is operated can be determined based on the input from the foot brake sensor 62*b* and the hand brake sensor 62*c*. For example, the brake is determined to be in operation when data inputted from the foot brake sensor 62*b* indicates that the rear wheel brake is in operation or when data inputted from the hand brake sensor 62*c* indicate that the front wheel brake is in operation. For example, the brake of the motorcycle 10 is determined to be in operation when either the front wheel brake or the rear wheel brake is in operation. However, the brake of the motorcycle 10 can be determined to be in operation only when both the brakes are in operation.

Figure 5:
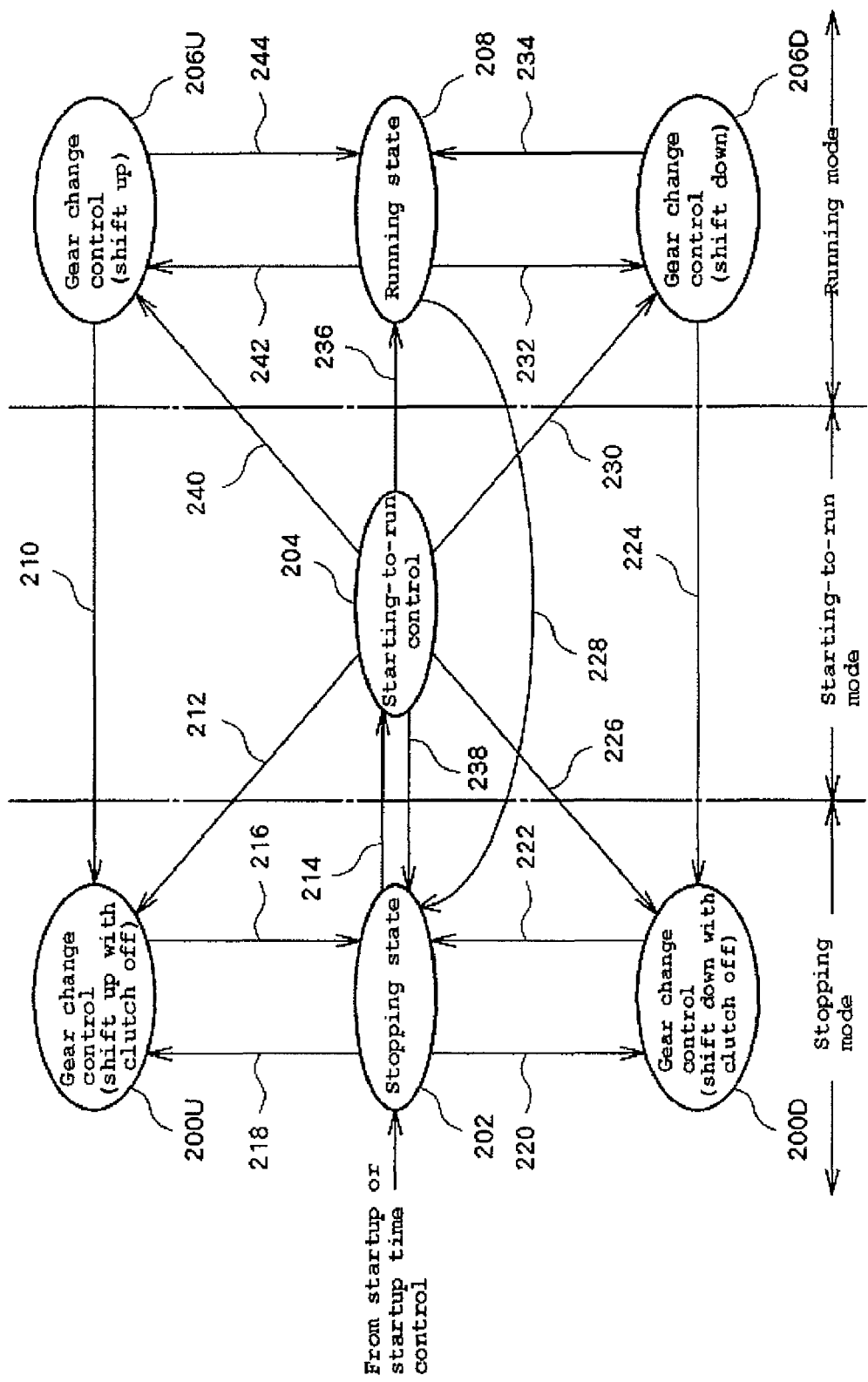
FIG. 5 is a schematic illustration of a control routine that can be executed by the gear change control device during normal conditions.

FIG. 5 is a control state transition diagram illustrating an embodiment of the normal control of the motorcycle 10. The main microcomputer 46 can execute the control method graphically shown in FIG. 5 when the "main key on" step shown in FIG. 4 is finished. As shown in FIG. 5, the main microcomputer 46 can be configured to execute gear change control programs 200U, 200D, 206U, and 206D, the stopping state program 202, a starting-to-run control program 204, and a running state program 208. These programs can also stored beforehand in the ROM (information storage medium) included in the main microcomputer 46. The normal control of the control device 40 has a stopping mode, a starting-to-run mode, and a running mode. The stopping mode is controlled by the stopping state program 202 and the gear change control programs 200U and 200D. The starting-to-run mode is controlled by the starting-to-run control program 204. The running mode is controlled by the running state program 208 and the gear change control programs 206U and 206D.

The stopping state program 202 can start to control the vehicle in response to a command from the startup program 108, the startup time control program 110, the gear change control programs 200U and 200D, and the running state program 208. The stopping state program 202 can maintain the state of the transmission and the clutch. When the shift up switch 62$i$ is determined to be pressed with the transmission set in neutral, the control can proceed (preferably immediately) to the gear change control program 200U (see arrow 218). When the shift down switch 62$j$ is determined to be pressed with the transmission set in any of the first to fifth gear positions (for example), the control can proceed (preferably immediately) to the gear change control program 200D (see arrow 220). If it is determined that the engine speed is a predetermined value n3 (see FIG. 7) or higher, the transmission can be set in any of the first to fifth gear positions (for example), and if the vehicle state does not meet starting-to-run prohibition conditions, the control proceeds (preferably immediately) to the starting-to-run control program 204 (arrow 214).

The starting-to-run prohibition conditions can be as follows: 1) the vehicle running speed is maintained at a predetermined speed (for example, 3 km/h) or lower for a predetermined period (for example, 3 seconds) or longer with the transmission set in the third gear position or higher (i.e., the vehicle is determined to stop running with the transmission in the third gear position or higher); or 2) the temperature of the coolant of the engine 16 is at a predetermined temperature (for example, 40° C.) or lower and the accelerator opening indicated by the accelerator sensor 62$a$ is a predetermined opening or smaller (i.e., the vehicle is determined to be at first idle).

The gear change control program 200U controls to disengage (i.e., off position) the clutch if the clutch is engaged (i.e., on position) and shift up the transmission by one gear position. For example, a clutch actuator drive signal of a predetermined pattern can be supplied to the motor drive circuit 42 to drive the clutch actuator 18. As a result, the clutch can be disengaged. Also, a shift actuator drive signal of a predetermined pattern can be supplied to the motor drive circuit 44 to drive the shift actuator 20. As a result, the transmission can be shifted. When the gear change control program 200U finishes the control as described above (clutch off and shift up), the control can proceed to the stopping state program 202 (see arrow 216).

In the same or similar manner, the gear change control program 200D can control to disengage (move to off position) the clutch if the clutch is engaged (in the on position) and shift down the transmission by one gear position. When this control (clutch off and shift down) is finished, the control can proceed to the stopping state program 202 (see arrow 222).

The starting-to-run control program 204 can start to control the vehicle in response to a command from the stopping state program 202. The starting-to-run control program 204 can execute starting-to-run control, for example, by obtaining the engine speed and driving the clutch actuator 18 to attain a clutch position in accordance with the obtained engine speed. For example, the main microcomputer 46 can reference a table where clutch positions of the clutch are correlated with the engine 16 speeds (see FIGS. 6 and 7) to set the clutch position in accordance with the engine 16 speed. During the starting-to-run control, if the engine speed is determined to have fallen to a predetermined value n' (n'≦n3) or lower, the control can proceed (preferably immediately) to the stopping state program 202 (see arrow 238). When the shift up switch 62$i$ is pressed down during the starting-to-run control, if it is determined that the transmission is set in any of the first to fourth gear positions and the clutch rotational speed difference is a predetermined value Δn (Δn can be a value at which substantially no shock occurs when the clutch is engaged under second control routine, e.g., half clutch control in changing gear positions during the normal running) or larger, the control proceeds (preferably immediately) to the gear change control program 200U (see arrow 212).

When the shift down switch 62$j$ is pressed down during the starting-to-run control, if it is determined that the transmission is set in any of the second to fifth gear positions and the clutch rotational speed difference is the predetermined value Δn or higher, the control can proceed (preferably immediately) to the gear change control program 200D (see arrow 226). When the shift up switch 62$i$ is pressed down during the starting-to-run control, if it is determined that the transmission is set in any of the first to fourth gear positions and the clutch rotational speed difference is smaller than the predetermined value Δn, the control can proceed (preferably immediately) to the gear change control program 206U (see arrow 240). When the shift down switch 62$j$ is pressed down during the starting-to-run control, if it is determined that the transmission is set in any of the second to fifth gear positions and the clutch rotational speed difference is smaller than the predetermined value Δn, the control can proceed (preferably immediately) to the gear change control program 206D (see arrow 230). If the clutch rotational speed difference has converged to a predetermined value Δn' (Δn' is a value at which substantially no shock occurs when the clutch is engaged (for example, 50 rpm)) or lower during the starting-to-run control, the control can proceed (preferably immediately) to the running state program 208 (see arrow 236).

The running state program 208 can start to control the vehicle in response to a command from the starting-to-run control program 204 and the gear change control programs 206U and 206D. The running state program 208 can maintain the state of the transmission and the clutch and can rotate the engine 16 according to the accelerator opening detected by the accelerator sensor 62$a$ to run the motorcycle 10. At this time, when the shift up switch 62$i$ is pressed down, if it is determined that the transmission is set in any of the first to fourth gear positions and the engine speed after shifting up will be a predetermined lower limit engine speed (i.e., under-rev speed) or higher, the control can proceed (preferably immediately) to the gear change control program 206U (see arrow 242). When the shift down switch 62$j$ is pressed down, if it is determined that the transmission is set in any of the second to fifth gear positions and the engine speed after shifting down will be a predetermined upper limit engine speed (i.e., over-rev speed) or lower, the control can proceed (preferably immediately) to the gear change control program 206D (see arrow 232). When the engine speed falls down to a predetermined value n" (n"≦n3) or lower with the transmission set in any of the first to fifth gear positions, the control can proceed to the stopping state program 202 (see arrow 228).

The gear change control program 206U can start to control the vehicle in response to a command from the running state program 208 and the starting-to-run control program 204. The gear change control program 206U can execute a shift up control, that is, drives the clutch actuator 18 to disengage the clutch, drive the shift actuator 20 to shift up the transmission, and then drive the clutch actuator 18 to reengage the clutch. In reengaging the clutch, a table where rates at which the clutch position is changed are correlated with the rotational speed differences between the driving member and the driven member of the clutch (see FIGS. 10 and 11) can referenced to change the clutch position at a rate in accordance with the rotational speed difference between the driving member and the driven member of the clutch (the gear change control program 206D can be executed in the same or similar manner). When the shift up control is finished, the control can proceed to the running state program 208 (see arrow 244). However, when the vehicle speed of the motorcycle 10 falls down to a predetermined speed or lower in particular during the shift up control, for example, the control can proceed to the gear change control program 200U (see arrow 210).

The gear change control program 206D can start to control the vehicle in response to a command from the running state program 208 or the starting-to-run control program 204. The gear change control program 206D can execute a shift down control, that is, drive the clutch actuator 18 to disengage the clutch, drive the shift actuator 20 to shift down the transmission, and then drive the clutch actuator 18 to reengage the clutch. When the series of control is finished, the control can proceed to the running state program 208 (see arrow 234). However, when the vehicle speed of the motorcycle 10 falls down to a predetermined speed or lower during the shift down control, for example, the control can proceeds to the gear change control program 200D (see arrow 224).

The vehicle control configured as described above can suitably control gear changes (i.e., control the transmission and the clutch) according to various running operation states of the motorcycle 10. Although not shown in FIG. 4 or 5, the main microcomputer 46 can have a resident program for determining and dealing with an abnormality so that abnormalities of the vehicle can be properly handled.

A description the starting-to-run control, the gear change control (i.e., shift up control) during running, and the gear change control during starting-to-run will now be provided.

Figure 6:
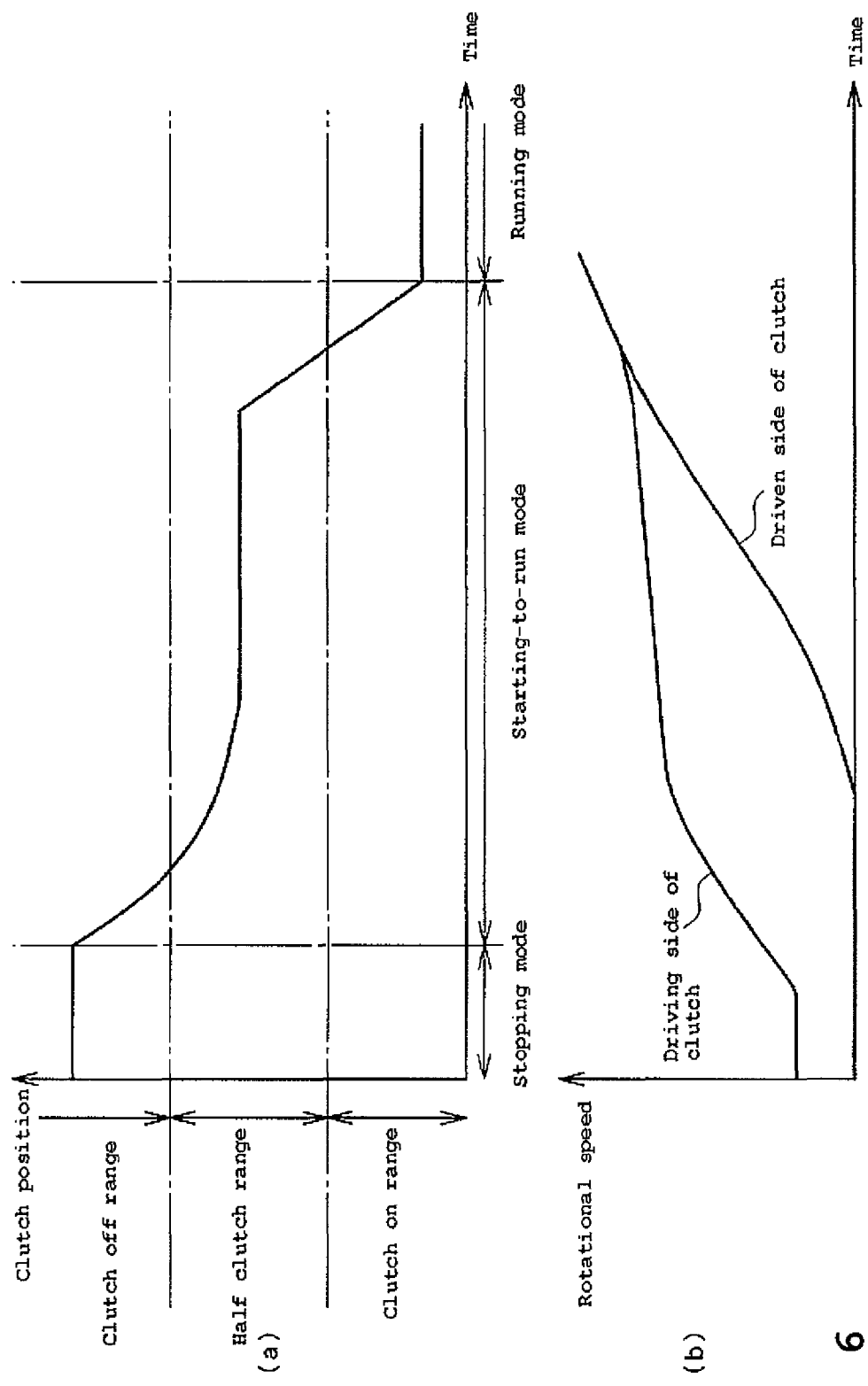
FIG. 6 a graphical illustration of a control routine that can be executed by the gear change control device during starting conditions.

With reference to FIG. 6, the starting-to-run control for the motorcycle 10 is shown graphically. FIG. 6 shows the transition of the state of the motorcycle 10 by the starting-to-run control. Specifically, FIG. 6(a) shows the transition of the clutch position over time, from the beginning to the end of the starting-to-run control and FIG. 6(b) shows the transition of the rotational speeds of the driving member and the driven member of the clutch over time, from the beginning to the end of the starting-to-run control. As shown in these drawings, when the control proceeds from the stopping state program 202 to the starting-to-run control program 204 and thus the control mode proceeds from the stopping mode to the starting-to-run mode, the clutch position can be controlled according to the table shown in FIG. 7. That is, the clutch position in accordance with the engine speed can be obtained from the table shown in FIG. 7 at predetermined intervals, and the clutch actuator 18 can be controlled to attain the obtained clutch position. When the clutch rotational speed difference converges to the predetermined value Δn' or smaller, the clutch can be engaged at a constant rate.

Figure 7:
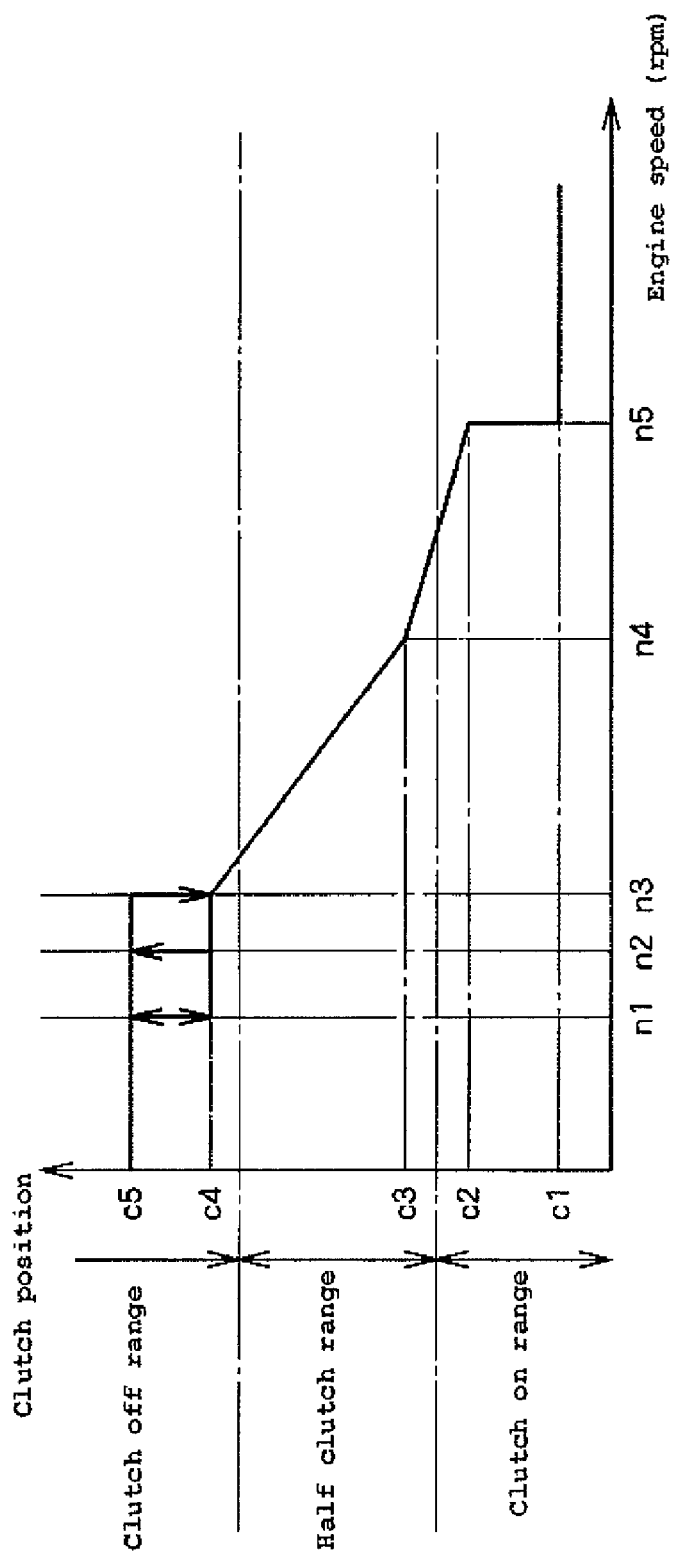
FIG. 7 illustrates a clutch position table that can be referenced during starting conditions.

In the table used in the starting-to-run control shown in FIG. 7, the engine speed and the clutch position can be correlated (n1<n2<n3<n4<n5; c1<c2<c3<c4<c5). In the table, the engine speed lower than n1 can be correlated with the clutch position c5 (e.g., the clutch completely off). The engine speed that is greater than n1 but lower than n3 can be correlated with the clutch positions c4 and c5. In this case, either of the clutch positions can be selected according to the starting-to-run preparation start conditions and the starting-to-run cancel conditions to be described later. The clutch position c4 can be set within a range where the driving force of the engine 16 is not transmitted to the rear wheel 24.

The engine speed not lower than n3 but lower than n4 can be correlated to the range of the clutch positions c4 through c3. A higher engine speed can be correlated to a clutch position with a smaller value (a narrower clutch position). The engine speed greater than n4 but lower than n5 can be correlated to the range of the clutch positions c3 through c2. A higher engine speed can be correlated to a clutch position with a smaller value. Lastly, the engine speed higher than n5 can be correlated to the clutch position c1 with the smallest value (the clutch completely on). This can be for engaging the clutch securely in the high speed range. The table shown in FIG. 7 can allow the clutch position to be set to a value in accordance with the engine speed during the starting-to-run control, and thereby allows the vehicle to start to run smoothly.

Description will now be made of the starting-to-run preparation start conditions and the starting-to-run preparation cancel conditions. The starting-to-run preparation start conditions can be as follows: a1) the transmission is set to a predetermined gear which permits starting to run (for example, the first gear and the second gear) and the engine speed is the predetermined value n3 (see FIG. 7) or higher; or a2) the engine speed is the predetermined value n1 (see FIG. 7) or higher and the accelerator opening is a predetermined amount or larger. When the engine speed is greater than n1 but lower than n3, if either of the above conditions a1 or a2 is satisfied, the clutch position c4 can be used. This can allow the vehicle to start to run immediately. The above condition a2 can require the accelerator opening to be a predetermined amount or larger, and thus can achieve smoother control. On the other hand, the starting-to-run preparation cancel conditions can be as follows: b1) the engine speed is lower than the predetermined value n2 (see FIG. 7) and the accelerator opening is smaller than a predetermined amount; or b2) the engine speed is lower than the predetermined value n1 (see FIG. 7). When the engine speed is greater than n1 but lower than n3, if either of the above conditions b1 or b2 is satisfied, the clutch position c5 can be used. Again, the above condition b1 can require the accelerator opening to be a predetermined amount or smaller, and thus can achieve smoother control.

The starting-to-run control as described above can securely and smoothly engage the clutch when the vehicle starts to run where the clutch rotational speed difference is large, by securely narrowing the distance between the clutch members as the engine speed increases.

Figure 8:
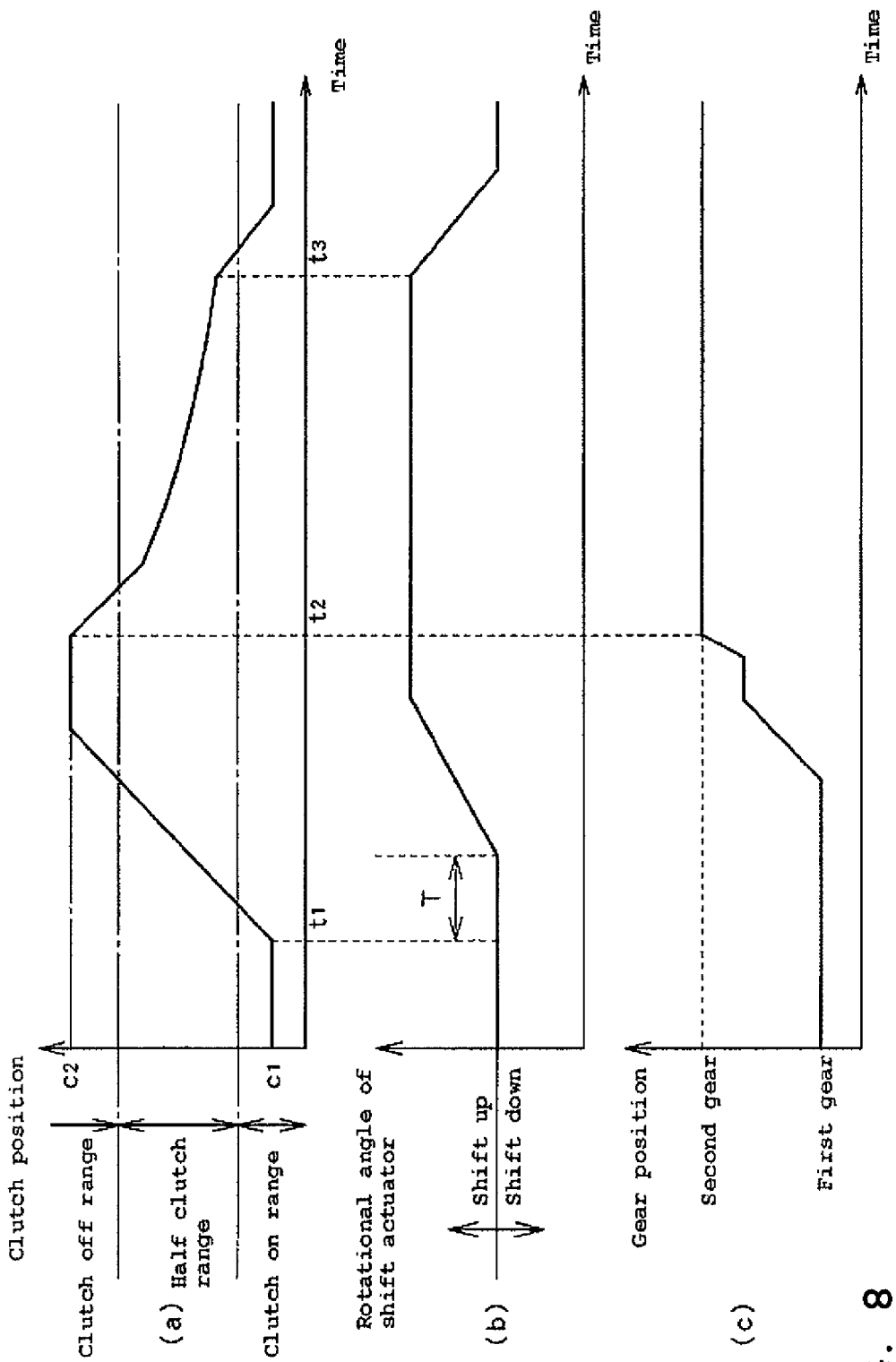
FIG. 8 is a graphical illustration of a control routine that can be executed by the gear change control device when shifting up during running conditions.
Figure 9:
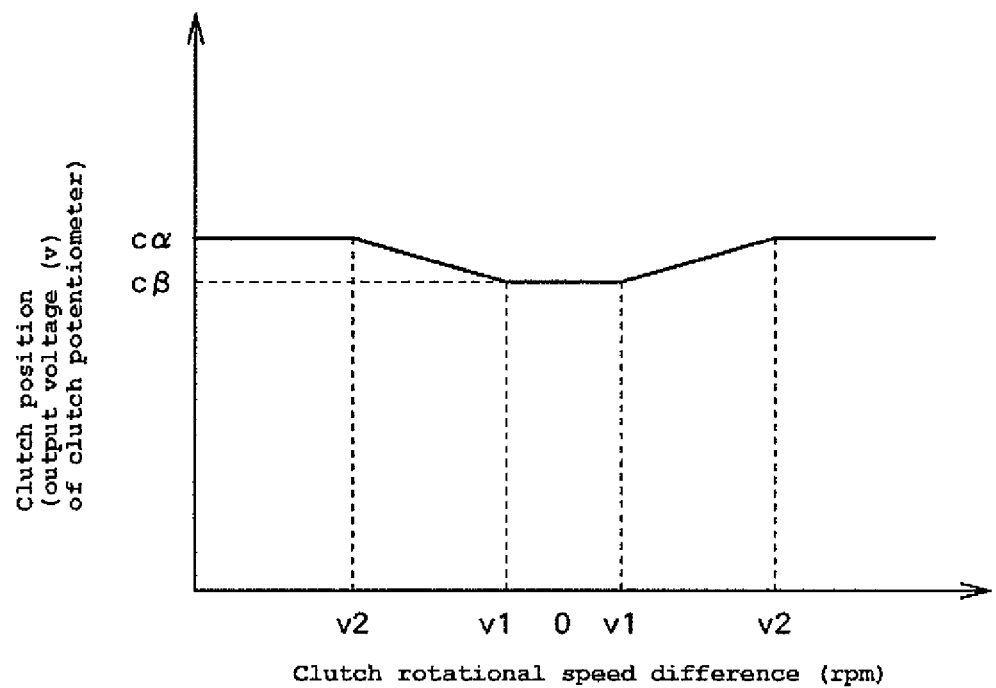
FIG. 9 illustrates a clutch position table that can be referenced when shifting up during running conditions.
Figure 10:
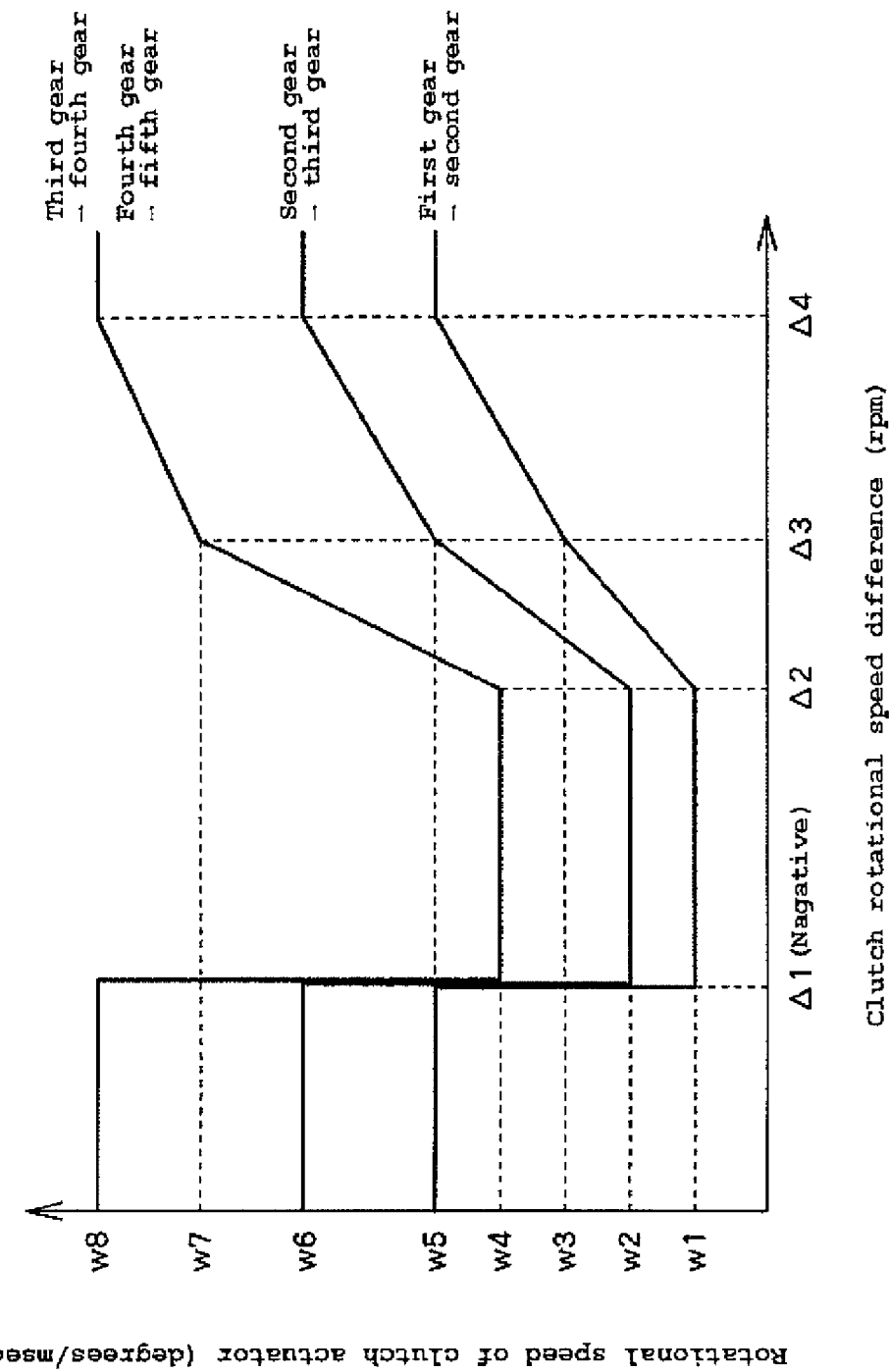
FIG. 10 illustrates a clutch position change rate table that can be referenced when shifting up during running conditions.

Next, description is made of the gear change control (shift up control) while the motorcycle 10 is running. As described above, this control can be executed by the gear change control program 206U. FIG. 8 shows the transition of the vehicle state over time during the shift up control (e.g., from the first gear to the second gear). FIG. 8(a) shows the transition of the clutch position over time. FIG. 8(b) shows the transition of the shift actuator rotational angle (or the shift arm rotational angle) over time. FIG. 8(*c*) shows the transition of the gear position outputted from the gear position sensor 62*d* over time. As shown in these drawings, when a shift up command is given (timing t1 in the drawing), the clutch actuator 18 can disengage the clutch at a constant rate. When a predetermined waiting period T elapses from the timing t1, the shift actuator 20 can be driven in the shift up direction. Then, when it is detected that the intended gear position is reached (timing t2 in the drawing), half clutch control can start. For example, the clutch position is set to a value in accordance with the clutch rotational speed difference at the timing t2 (initial value) according to the table shown in FIG. 9. In the table shown in FIG. 9, the clutch rotational speed difference and the initial value of the clutch position can be correlated. The gear change control program 206U monitors the timing at which the clutch position reaches the initial value obtained from this table. When the clutch position reaches the initial value (timing t3 in the drawing), then the clutch position change rate in accordance with the clutch rotational speed difference can be obtained according to the table shown in FIG. 10 at predetermined intervals, and the clutch position can be changed (i.e., the clutch position is narrowed) at the obtained change rate. Also, the shift actuator 20 can be returned to its initial position at the timing t3.

The gear change control as described above can determine the clutch position in accordance with the clutch rotational speed difference during gear changes, and thus can change gears immediately during running.

Description will now be made of the gear change control where a shift up is performed when the motorcycle 10 starts to run. The starting-to-run control program 204 can make the motorcycle 10 start, which has been stationary with the clutch disengaged and the transmission in gear, to run by engaging the clutch under the above starting-to-run control (see FIG. 6). The starting-to-run control program 204 can also determines whether or not a shift up or shift down command is given to the transmission while the clutch is half engaged. If it is determined that a shift up command is given while the clutch is being engaged, either of the following controls can be performed depending on the state of the motorcycle 10: U1) the gear change control program 200U once disengages the clutch and causes the transmission to change gears according to the shift up command, and the starting-to-run control program 204 reengages the clutch (arrows 212, 216, and 214); or U2) the gear change control program 206U once disengages the clutch and causes the transmission to change gears according to the shift up command, and the clutch is reengaged under control different from the predetermined starting-to-run control described above (arrow 240).

On the other hand, if it is determined that a shift down command is given while the clutch is being engaged, either of the following controls can be performed depending on the state of the motorcycle 10: D1) the gear change control program 200D once disengages the clutch and causes the transmission to change gears according to the shift down command, and the starting-to-run control program 204 reengages the clutch (arrows 226, 222, and 214); or D2) the gear change control program 206D once disengages the clutch and causes the transmission to change gears according to the shift up command, and the clutch is reengaged under control different from the predetermined starting-to-run control described above (arrow 230).

Figure 11:
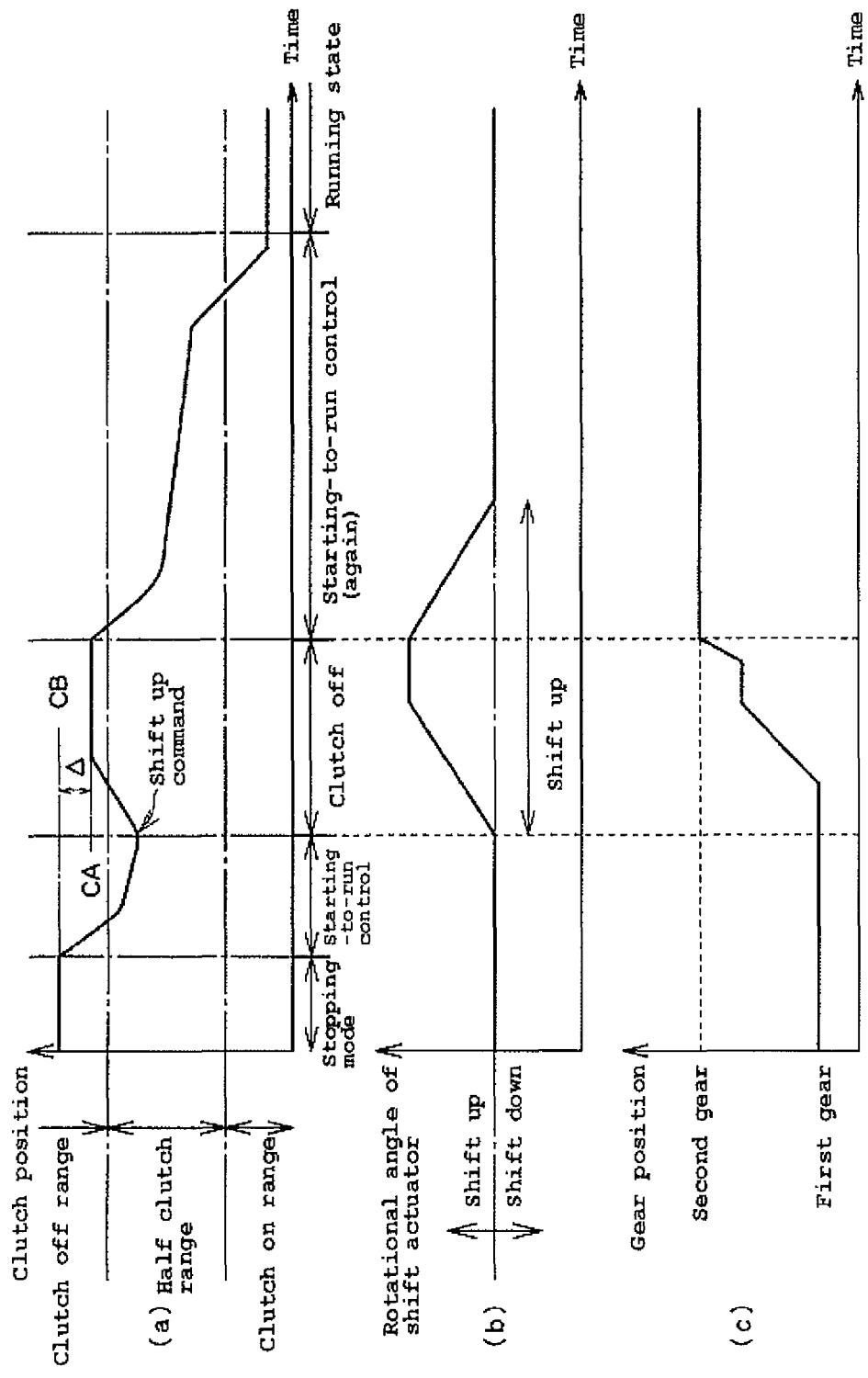
FIG. 11 is a graphical illustration of a shift up control routine that can be executed by the gear change control device during starting conditions.

FIG. 11 shows the transition of the vehicle state over time when a shift up command is given during the starting-to-run control and the control of U1 above is executed. FIG. 11(*a*) shows the transition of the clutch position over time. FIG. 11(*b*) shows the transition of the shift actuator rotational angle (or the shift arm rotational angle) over time. FIG. 11(*c*) shows the transition of the gear position outputted from the gear position sensor 62*d* over time. As shown in these drawings, when the starting-to-run control program 204 starts the starting-to-run control and a shift up command is inputted from the shift up switch 62*i* during the starting-to-run control, the clutch rotational speed difference and the gear position can be obtained. If it is determined that the transmission is set in any of the first to fourth gear positions and the clutch rotational speed difference is the predetermined value Δn or smaller, the control can proceed (preferably immediately) to the gear change control program 200U (see arrow 212).

The gear change control program 200U can drive (preferably immediately) the clutch actuator 18 to set the clutch to a clutch position CA which is a predetermined amount Δ displaced in the clutch engaging direction from a clutch position CB where the clutch is completely disengaged. The gear change control program 200U can also drive the shift actuator 20 to cause the transmission to change gears (shift up). When the shift up is completed, the gear change control program 200U can return the shift actuator 20 to its initial position, and the control can proceed to the stopping state program 202 (see arrow 216). If the stopping state program 202 determines that the engine speed is the predetermined value n3 (see FIG. 7) or higher, the transmission is set in any of the first to fifth gear positions, and the vehicle state does not meet the starting-to-run prohibition conditions, the control can proceed (preferably immediately) to the starting-to-run control program 204 (see arrow 214). Then, the starting-to-run control program 204 can reengage the clutch using the tables of FIGS. 6 through 7.

When a shift up command is inputted during the starting-to-run control, if it is determined that the transmission is set in any of the first to fourth gear positions and the clutch rotational speed difference is smaller than the predetermined value Δn, the control can proceed from the starting-to-run control program 204 to the gear change control program 206U (arrow 240). The change gear control is executed using the tables of FIG. 8 through FIG. 10.

The gear change control system as described above advantageously executes different clutch controls depending on the clutch rotational speed difference when a gear change operation is performed using the shift up switch 62*i* or the shift down switch 62*j* during the starting-to-run control by the starting-to-run control program 204. Therefore, the system can achieve clutch engagement suitable for the vehicle state, thereby improving the riding comfort of the motorcycle 10.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

The above-described systems and methods can also be used with other types of transmissions, clutch mechanisms and associated control systems and routines, such as those described in one or more of the following copending United States Patent Applications: (1) application Ser. No. 11/301,282, filed on Dec. 12, 2005, which is entitled STRADDLE-TYPE VEHICLE HAVING CLUTCH CONTROL DEVICE AND METHOD OF USING CLUTCH CONTROL DEVICE and which has; (2) application Ser. No. 11/301,288, filed on Dec. 12, 2005, which is entitled STRADDLE-TYPE VEHICLE HAVING CLUTCH ENGAGEMENT CON- TROL DEVICE AND METHOD OF USING CLUTCH ENGAGEMENT CONTROL DEVICE and which has; (3) application Ser. No. 11/301,646, filed on Dec. 12, 2005, which is entitled CLUTCH ACTUATOR FOR STRADDLE-TYPE VEHICLE and which has; and (4) application Ser. No. 11/299,720, filed on Dec. 12, 2005, which is entitled APPARATUS AND METHOD FOR CONTROLLING TRANSMISSION OF STRADDLE-TYPE VEHICLE and which has. The contents of all of the above-noted copending U.S. patent applications are hereby incorporated by reference in their entireties.

In addition, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. For example, various methods comprising one or more steps and procedures have been described. However, it should be appreciated that in modified embodiments, the order of these steps and procedures can be changed and/or one or more steps and procedures can be combined, eliminated and/or subdivided. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A gear change control device for a straddle-type vehicle having a clutch and a transmission driven by respective actuators, comprising:
    means for engaging the clutch under a first control routine, when the straddle-type vehicle is stopped with the clutch disengaged and the transmission in gear;
    means for determining whether a gear change command has been given to the transmission while the clutch is being engaged;
    means for, when the gear change command is given while the clutch is being engaged, causing the transmission to change gears according to the gear change command once the clutch is disengaged and then reengaging the clutch under either the first control routine or a second control routine that is different from the first control routine depending on a state of the straddle-type vehicle; and
    means for engaging the clutch under the first control routine when a rotational speed difference between a driving member and a driven member of the clutch is equal to or greater than a predetermined value, and means for engaging the clutch under the second control routine when the rotational speed difference between the driving member and the driven member of the clutch is less than the predetermined value.

2. The gear change control device according to claim 1, wherein the first control routine comprises instructions to reengage the clutch by changing a position of the clutch as a function of an engine speed of an engine mounted on the straddle type vehicle.

3. The gear change control device according to claim 1, wherein the second control routine comprises instructions to reengage the clutch by changing a clutch position at a rate which is determined by the rotational speed difference between the driving member and the driven member of the clutch.

4. The gear change control device according to claim 1, in combination with the straddle-type vehicle.

5. The gear change control device according to claim 4, wherein the straddle-type vehicle is a motorcycle.

6. A gear change control device for a straddle-type vehicle having a clutch and a transmission driven by respective actuators, comprising:
    means for engaging the clutch under a first control routine, when the straddle-type vehicle is stopped with the clutch disengaged and the transmission in gear;
    means for determining whether a gear change command has been given to the transmission while the clutch is being engaged; and
    means for, when the gear change command is given while the clutch is being engaged, causing the transmission to change gears according to the gear change command once the clutch is disengaged and then reengaging the clutch under either the first control routine or a second control routine that is different from the first control routine depending on a state of the straddle-type vehicle; wherein
    the first control routine comprises instructions to reengage the clutch by changing a position of the clutch as a function of an engine speed of an engine mounted on the straddle type vehicle; and
    the first control routine comprises instructions to reference a table that correlates the position of the clutch with the engine speed.

7. The gear change control device according to claim 6, wherein the state of the straddle-type vehicle comprises a rotational speed difference between a driving member and a driven member of the clutch.

8. A gear change control device for a straddle-type vehicle having a clutch and a transmission driven by respective actuators, comprising:
    means for engaging the clutch under a first control routine, when the straddle-type vehicle is stopped with the clutch disengaged and the transmission in gear;
    means for determining whether a gear change command has been given to the transmission while the clutch is being engaged; and
    means for, when the gear change command is given while the clutch is being engaged, causing the transmission to change gears according to the gear change command once the clutch is disengaged and then reengaging the clutch under either the first control routine or a second control routine that is different from the first control routine depending on a state of the straddle-type vehicle; wherein
    the second control routine comprises instructions to reengage the clutch by changing a clutch position at a rate which is determined by a rotational speed difference between a driving member and a driven member of the clutch; and
    the second control routine comprises instructions to reference a table where the rate which the clutch position of the clutch is changed is correlated with the rotational speed difference between the driving member and the driven member.

9. A gear change control device for a straddle-type vehicle having a clutch and a transmission, comprising:
a clutch actuator configured to engage and disengage the clutch;
a transmission actuator configured to change a gear of the transmission;
at least one sensor configured to sense an operational condition of the straddle type vehicle;
at least one switch configured to generate a gear change command; and
a controller operatively connected to the clutch actuator, the transmission actuator, the at least one sensor, and the at least one switch, the controller configured to change gears in response to the gear change command and during the gear change reengage the clutch under either a first control routine or a second, different control routine based upon the operational condition of the straddle-type vehicle determined by the at least one sensor; wherein
the gear change command is given while the clutch is being engaged; and
the controller engages the clutch under the first control routine when a rotational speed difference between a driving member and a driven member of the clutch is equal to or greater than a predetermined value, and wherein the controller engages the clutch under the second control routine when the rotational speed difference between the driving member and the driven member of the clutch is less than the predetermined value.

10. The gear change control device according to claim 9, wherein the first control routine comprises instructions to reengage the clutch by changing a position of the clutch as a function of an engine speed of an engine mounted on the straddle type vehicle.

11. The gear change control device according to claim 9, wherein the second control routine comprises instructions to reengage the clutch by changing a clutch position at a rate which is determined by the rotational speed difference between the driving member and the driven member of the clutch.

12. The gear change control device according to claim 9, wherein the controller is configured to reengage the clutch under either the first control routine or the second, different control routine when the vehicle is in a starting to run condition.

13. The gear change control device according to claim 12, additionally comprising an engine speed sensor configured to sense an engine speed of an engine of the straddle-type vehicle and wherein the controller is configured to determine if the straddle-type vehicle is in the starting to run condition based, at least in part, on the engine speed.

14. The gear change control device according to claim 12, additionally comprising an accelerator sensor configured to sense an accelerator opening of an engine of the straddle-type vehicle and wherein the controller is configured to determine if the straddle-type vehicle is in the starting to run condition based, at least in part, on the accelerator opening.

15. The gear change control device according to claim 12, additionally comprising a coolant temperature sensor configured to sense an engine coolant temperature for an engine of the straddle-type vehicle and wherein the controller is configured to determine if the straddle-type vehicle is in the starting to run condition based, at least in part, on the engine coolant temperature.

* * * * *